(12) United States Patent
Elkatatny et al.

(10) Patent No.: US 11,898,089 B2
(45) Date of Patent: Feb. 13, 2024

(54) USE OF GRANITE WASTE POWDER IN LIGHTWEIGHT OILWELL CEMENT SYSTEMS; STRENGTH ANALYSIS

(71) Applicant: KING FAHD UNIVERSITY OF PETROLEUM AND MINERALS, Dhahran (SA)

(72) Inventors: Salaheldin Elkatatny, Dhahran (SA); Stephen Adjei, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/900,360

(22) Filed: Aug. 31, 2022

(65) Prior Publication Data

US 2023/0287257 A1    Sep. 14, 2023

Related U.S. Application Data

(60) Provisional application No. 63/318,147, filed on Mar. 9, 2022.

(51) Int. Cl.

| | | |
|---|---|---|
| C09K 8/48 | (2006.01) | |
| C04B 18/12 | (2006.01) | |
| C04B 14/18 | (2006.01) | |
| C04B 14/30 | (2006.01) | |
| C04B 14/06 | (2006.01) | |
| C04B 22/12 | (2006.01) | |
| C04B 14/10 | (2006.01) | |
| C04B 103/50 | (2006.01) | |
| C04B 103/40 | (2006.01) | |

(52) U.S. Cl.
CPC .............. C09K 8/48 (2013.01); C04B 14/06 (2013.01); C04B 14/104 (2013.01); C04B 14/18 (2013.01); C04B 14/308 (2013.01); C04B 18/12 (2013.01); C04B 22/124 (2013.01); C04B 2103/408 (2013.01); C04B 2103/50 (2013.01)

(58) Field of Classification Search
CPC ......... C09K 8/48; C04B 14/06; C04B 14/104; C04B 14/18; C04B 14/308; C04B 18/12; C04B 22/124; C04B 2103/408; C04B 2103/50

See application file for complete search history.

(56) References Cited

U.S. PATENT DOCUMENTS

| | | | | |
|---|---|---|---|---|
| 6,145,591 | A * | 11/2000 | Boncan | C09K 8/46 166/291 |
| 8,568,527 | B2 | 10/2013 | Anderson et al. | |
| 11,162,014 | B2 | 11/2021 | Jones et al. | |
| 2006/0175060 | A1* | 8/2006 | Reddy | C04B 28/02 166/292 |
| 2019/0270925 | A1* | 9/2019 | Mahmoud | C09K 8/265 |
| 2021/0130677 | A1* | 5/2021 | Stacey | C04B 18/021 |

FOREIGN PATENT DOCUMENTS

| | | |
|---|---|---|
| CN | 103539368 A | 1/2014 |
| CN | 105418153 A | 3/2016 |
| CN | 108395882 A | 8/2018 |

OTHER PUBLICATIONS

Ahmed, et al. ; The Use of the Granite Waste Material as an Alternative for Silica Flour in Oil-Well Cementing ; ACS Omega 2020, 5 ; 8 Pages.
Mansour, et al. ; Valorization of powder of volcanic rocks used as cement substitution in self-compacting concrete ; European Journal of Environmental and Civil Engineering ; May 17, 2021 ;Abstract Only ; 2 Pages.
Shilar, et al. ; Evaluation ofthe Effect of GraniteWaste Powder by Varying the Molarity of Activator on the Mechanical Properties of Ground Granulated Blast-Furnace Slag-Based Geopolymer Concrete ; MDPI Polymers 2022, 14 ; Jan. 13, 2022 ; 15 Pages.

* cited by examiner

*Primary Examiner* — Silvana C Runyan
(74) *Attorney, Agent, or Firm* — Oblon, McClelland, Maier & Neustadt, L.L.P.

(57) ABSTRACT

A method for treating a well in a hydrocarbon-producing subterranean production zone. The method for treating well-producing hydrocarbons from a subterranean production zone includes dry mixing a granite waste powder (GWP) in a form of rock aggregates and a cement to form a mixture. Then the mixture is added to the cement composition containing water, pre-hydrated sodium bentonite, calcium chloride, a dispersant, and an alcohol-based defoamer to form a cement slurry. The cement slurry is prepared at a density of from 13.5 pounds per gallon (ppg) to 14.5 ppg and contains the GWP in a range of from 5 wt. % to 20 wt. % of the cement slurry. 10 wt. % to 15 wt. % perlite is added into the cement slurry to form a ternary blend which is cured and then the cured product is injected into the well to seal the well at the subterranean production zone.

20 Claims, 10 Drawing Sheets

US 11,898,089 B2

USE OF GRANITE WASTE POWDER IN LIGHTWEIGHT OILWELL CEMENT SYSTEMS; STRENGTH ANALYSIS

CROSS-REFERENCE TO RELATED APPLICATION

The present application claims benefit of priority to U.S. Provisional Application No. 63/318,147, having a filing date of Mar. 9, 2022, which is incorporated herein by reference in its entirety.

BACKGROUND

Technical Field

The present disclosure is directed to concrete technology, particularly to treating well-producing hydrocarbons from a subterranean production zone and a method of preparation thereof.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

An oil-well cement is used in the drilling of oil wells where they are subject to high temperatures and pressures. The oil-well cement is made of a Portland or pozzolanic cement with special organic retarders to prevent cement from setting too quickly. In the past, oil-well cement systems used in isolating intervals and supporting a casing in petroleum wells were typically designed at densities between 15.6 to 16.4 pounds per gallon (ppg). Such systems are inapplicable in formations with low fracture gradients as they impose high pressure or high equivalent circulating density (ECD) on the bare formation, leading to formation breakdown, loss of a cement slurry, and the loss of the well's integrity. Conventionally, there are several techniques for reducing the cement slurry density. Many studies have indicated that when two or more pozzolans/filler materials are admixed, their combined effect might be a physical or chemical mechanism that results in hardened composites with enhanced properties. The use of filler materials also impacts the health associated with their disposal. Therefore, there is an unmet need to find the replacement of the cement with developed strength in oil-well lightweight systems.

SUMMARY

In an exemplary embodiment, a method for treating a well in a hydrocarbon-producing subterranean production zone is described. The method for treating a well in a hydrocarbon-producing subterranean production zone includes dry mixing a granite waste powder (GWP) and a cement to form a mixture. The GWP has a $D_{50}$ diameter of from 10 micrometers (µm) to 100 µm. Then the mixture is added to the aqueous composition containing water, pre-hydrated sodium bentonite, calcium chloride, a dispersant, and an alcohol-based defoamer to form a cement slurry. The cement slurry is prepared at a density of from 13.5 pounds per gallon (ppg) to 14.5 ppg and contains the GWP in a range of from 5 percent weight (wt. %) to 20 wt. % of the cement slurry. 10 wt. % to 15 wt. % of the cement slurry perlite is added into the cement slurry to form a ternary blend. The ternary blend is further injected into the well at the subterranean production zone The ternary blend is then cured to seal a well of the well at the subterranean production zone. The cured ternary blend has a compressive strength of from 30,000 pounds per square inch (psi) to 50,000 psi at an effective pressure of 15,000 psi in the well.

In some embodiments, the curing takes place for approximately 48 hours. In some embodiments, the GWP has a pozzolanic reaction with the cement during the curing producing a strength activity of from 100% to 110% compared to the cement.

In some embodiments, the curing is at a bottomhole circulating temperature (BHCT) of at least 100 degrees Fahrenheit (° F.), a bottomhole static temperature (BHST) of at least 160° F., and a bottomhole pressure (BHP) of at least 2600 pound-force per square inch (psi).

In some embodiments, adding the GWP and the cement to form the mixture includes blending at a speed of at least 20,000 rotations per minute (rpm).

In some embodiments, the aqueous composition consists of GWP, cement, distilled water, pre-hydrated sodium bentonite, calcium chloride, a dispersant, and an alcohol-based defoamer.

In some embodiments, the ternary blend has a thickening time of from 120 minutes to 175 minutes which is measured at a BHCT of at least 100° F.

In some embodiments, the cement has an amount of calcium oxide (CaO) of from 75 wt. % to 80 wt. % of the cement, an amount of silicon dioxide ($SiO_2$) of from 5 wt. % to 8 wt. % of the cement, and an amount of ferric oxide ($Fe_2O_3$) of from 8 wt. % to 12 wt. % of the cement.

In some embodiments, the GWP has the amount of $SiO_2$ of from 60 wt. % to 65 wt. % of the GWP, the amount of $Fe_2O_3$ of from 15 wt. % to 21 wt. % of the GWP, and the amount of aluminum oxide ($Al_2O_3$) of from 7 wt. % to 14 wt. % of the GWP.

In some embodiments, a perlite has the amount of $SiO_2$ of from 70 wt. % to 75 wt. % of the perlite, the amount of $Fe_2O_3$ of from 1 wt. % to 2 wt. % of the perlite, and the amount of $Al_2O_3$ of from 9 wt. % to 15 wt. % of the perlite.

In some embodiments, a cured cement has a density of at least 3 grams per cubic centimeter ($g/cm^3$).

In some embodiments, the GWP has a $D_{50}$ diameter of from 20 µm to 50 µm.

In some embodiments, the cement slurry has a sonic strength of from 650 psi to 1050 psi.

In some embodiments, the ternary blend has a sonic strength of from 200 psi to 1575 psi.

In some embodiments, the method further includes mixing the GWP in the cement slurry in a range of from 5 wt. % to 15 wt. % of the cement slurry. In some embodiments, the perlite is present in the cement slurry in a range of from 10 wt. % to 15 wt. % of the cement slurry perlite.

In some embodiments, the ternary blend has the cement in an amount of from 80 wt. % to 85 wt. % of the ternary blend, the GWP in an amount of from 5 wt. % to 15 wt. % of the ternary blend, the perlite in an amount of from 5 wt. % to 10 wt. % of the ternary blend, the ($CaCl_2$) in an amount of at least 1 wt. % of the ternary blend, the bentonite in an amount of at least 2 wt. % of the ternary blend, a defoamer mass of at least 0.5 g, and has a water to cement ratio of from 80% to 85%.

In some embodiments, the ternary blend has the cement in an amount of from 55 wt. % to 65 wt. % of the ternary blend, the GWP in an amount of from 5 wt. % to 15 wt. % of the ternary blend, the perlite in an amount of from 5 wt. % to 10 wt. % of the ternary blend, the ($CaCl_2$) in an amount of at least 1 wt. % of the ternary blend, the bentonite in an amount of at least 2 wt. % of the ternary blend, a defoamer mass of at least 0.5 g, and a water to cement ratio of from 75% to 80%.

In some embodiments, the ternary blend has the cement in an amount of from 45 wt. % to 55 wt. % of the ternary blend, the GWP in an amount of from 5 wt. % to 15 wt. % of the ternary blend, the perlite in an amount of from 10 wt. % to 15 wt. % of the ternary blend, the $CaCl_2$) in an amount of at least 1 wt. % of the ternary blend, the bentonite in an amount of at least 2 wt. % of the ternary blend, a defoamer mass of at least 0.5 g, and a water to cement ratio of from 75% to 80%.

In some embodiments, the amount of silica, alumina, and iron oxide in the ternary blend exceeds 70 wt. %.

In some embodiments, the perlite has a $D_{50}$ diameter of from 70 μm to 100 μm.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
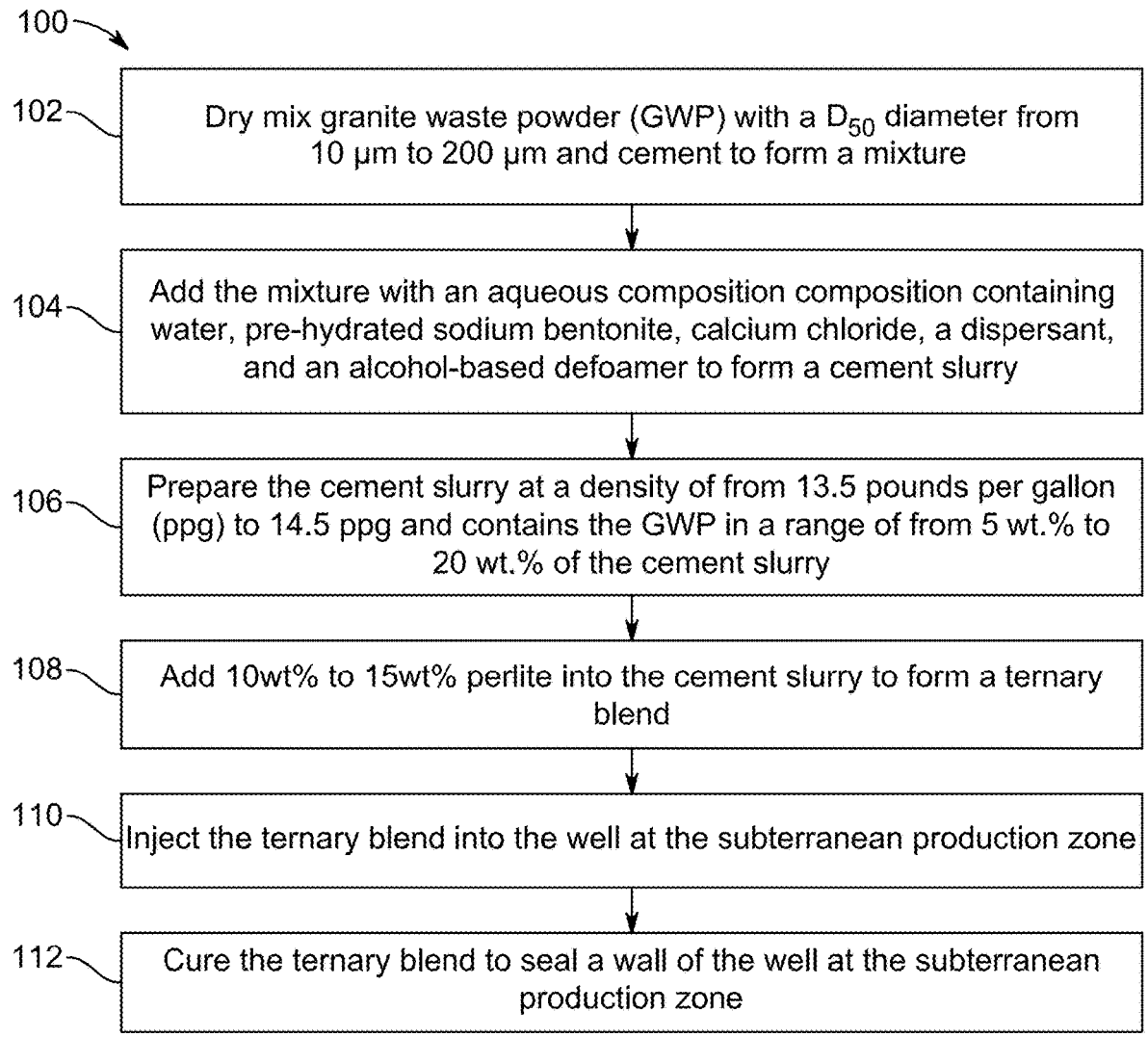
FIGS. 1A and 1B are schematic flow diagrams of a method for treating well-producing hydrocarbons from a subterranean production zone and injecting a ternary blend into a well, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term, "subterranean" refers to an area under the ground.

As used herein, the term, "defoamer" refers to a foam control agent which are added to a system to reduce or eliminate foam or air bubbles after it has been formed. Non-limiting examples of defoamers include cetostearyl alcohol, lauryl alcohol, cetyl alcohol, stearyl alcohol, oleyl alcohol, decyl alcohol, dodecyl alcohol, and higher fatty alcohols.

As used herein, the term, "blend" refers to a mix (of substances) with another substance so that they combine together and homogenize.

As used herein, the term, "curing" refers to a process during which a chemical reaction (such as polymerization) or physical action (such as evaporation) takes place, resulting in a harder, tougher, or more stable linkage (such as an adhesive bond) or substance (such as concrete). Non-limiting examples of curing processes include water curing, wet covering, formwork curing, membrane curing, sheet curing, absorption heat curing, hot mixing, electrical curing, infra-red curing, sand/sawdust covering, or natural curing.

As used herein, the term, "slurry" refers to a mixture of denser solids suspended in liquid, usually water, that maintain a homogeneous mixture.

As used herein, the term, "strength activity" refers to the ratio of the strength of the cement mixture with a pozzolan to the strength of the reference (cement mortar) without the pozzolan at a specific curing time. The rate of strength development of cement mortar relies principally on its hydration rate.

As used herein, the term "pozzolans" refers to a broad class of siliceous and aluminous materials which, in themselves, possess little or no cementitious value but which will, in finely divided form and in the presence of water, react chemically with calcium hydroxide (Ca(OH)2) at ordinary temperature to form compounds possessing cementitious properties. Non-limiting examples of pozzolans include calcined clay, calcined shale, metakaolin, kaolin clay, fly ash, rice husk ash, silica fume, bagasse ash, Portland cement, blast furnace slag, and pumice.

Embodiments of the present disclosure have directed a method for treating a well-producing hydrocarbon from a subterranean production zone. The present disclosure describes using a granite waste powder (GWP) in a lightweight cement system and an effect of a perlite on a strength development of such a composite. GWP can be defined as the industrial waste product of granite manufacturing, leaving behind remains of granite that are pulverized to form a powder to then be used for further applications. The cement-GWP binary slurries were prepared at approximately 13.5 pounds per gallon (ppg) to 14.5 ppg, preferably 13.6 ppg to 14.4 ppg, preferably 13.7 ppg to 14.3 ppg, preferably 13.8 ppg to 14.2 ppg, preferably 13.9 ppg to 14.1 ppg, or 14 ppg and replacing cement with 0, 5, 10, 15, and 20% of the GWP. About 10 to 15% perlite was included in cement-GWP-perlite ternary blends preferably 10.5 wt. % to 14.5 wt. %, preferably 11 wt. % to 14 wt. %, preferably 11.5 wt. % to 13.5 wt. %, preferably 12 wt. % to 13 wt. %, or 12.5 wt. %. The slurries were cured at a bottom hole circulating temperature (BHCT) of 114 degrees Fahrenheit (° F.), preferably 116° F., preferably 118° F., preferably 120° F., preferably 122° F., preferably 124° F., preferably 126° F., preferably 128° F., or 130° F.; a bottom hole static temperature (BHST) of 163° F., preferably 164° F., preferably 165° F., preferably 166° F., preferably 167° F., preferably 168° F., preferably 169° F., or 170° F.; and bottom hole pressure (BHP) of 2600 pound-force per square inch (psi), preferably 2590 psi, preferably 2580 psi, preferably 2570 psi, preferably 2560 psi, or 2550 psi. The BHCT can be described as the temperature of a circulating fluid (cement) at the bottom of the well after circulation of the fluid. The BHST can be described as the temperature at the bottom of a well without disturbance or circulation of a fluid. The BHP can be described as the pressure at the bottom of the well and is equal to a pressure drop of the tubing of the well plus the well head pressure. X-ray diffraction (XRD) was used to evaluate the hydration and pozzolanic processes.

It was observed that strength of the binary cement-GWP composite decreased with increasing cement replacement due to the dilution effect, which was confirmed by XRD analysis. The strength development over 120 hours indicates that the effect of GWP is a gradual process, due to the material's low pozzolanic reactivity and would impact the long-term strength.

Inclusion of perlite into the cement-GWP composite resulted in much improvement in the strength at early times due to a high pozzolanic of the perlite. This allows for the design of lightweight systems using the GWP in high volume. A ternary system composed of 50 wt. % cement, 35 wt. % GWP and 15 wt. % perlite exhibit a comparable thickening time and 48-hour strength that is 53% higher than the control sample composed of 100% cement.

Figure 1B:
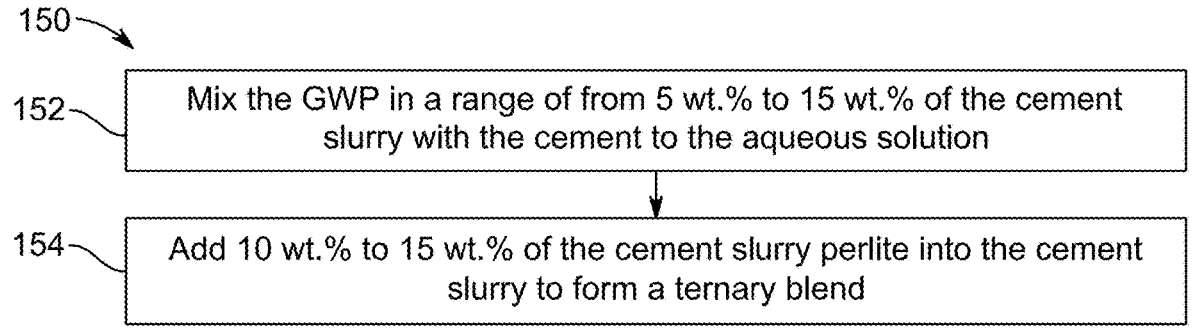

Referring to FIG. 1, a schematic flow diagram of the method 100 for treating a well producing hydrocarbons from the subterranean production zone is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes dry mixing of the GWP and the cement to form a mixture. In some embodiments, adding the GWP and the cement to form the mixture includes blending at a speed of at least 20,000 rotations per minute (rpm), preferably at least 21,000 rpm, preferably 22,000 rpm, preferably 23,000 rpm, preferably 24,000 rpm, or 25,000 rpm. Dry mixing can be defined by mixing the materials without the presence of any water or liquid. In some embodiments, the GWP is added in a form of rock aggregates having a density of from 50 pounds per cubic foot (pcf) to 1000 pcf, preferably 100 pcf to 900 pcf, preferably 200 pcf to 800 pcf, preferably 300 pcf to 700 pcf, preferably 400 pcf to 600 pcf, or 500 pcf. In some embodiments, the GWP rock aggregates have a $D_{50}$ diameter that ranges of from 10 µm to 100 µm, preferably 20 µm to 90 µm, preferably 30 µm to 80 µm, preferably 40 µm to 70 µm, preferably 50 µm to 60 µm, or 55 µm. The $D_{50}$ diameter can be described as when the particle size reaches a cumulative percentage of 50%. For instance, a powder sample with a $D_{50}$ diameter of 5 µm means 50% of particles are larger than 5 µm and 50% particles are smaller than 5 µm.

At step 104, the method 100 includes adding the mixture to an aqueous composition containing water, pre-hydrated sodium bentonite, calcium chloride, a dispersant, and an alcohol-based defoamer to form a cement slurry. In another embodiment, the cement slurry only includes GWP, cement, distilled water, pre-hydrated sodium bentonite, calcium chloride, a dispersant, and an alcohol-based defoamer. In certain embodiments, the sodium bentonite may be substituted with materials such as calcium bentonite, potassium bentonite, iron bentonite, or magnesium bentonite. The dispersant can be defined as a chemical additive that reduces the cement slurry viscosity to improve fluid flow and can include citric acid, lignosulfonates, salicylic acid, gluconic acid, glucoheptonic acid, polynaphthalene sulfonate, polymelamine sulfonate (PMS), polystyrene sulfonate (PSS).

At step 106, the method 100 includes preparing the cement slurry at a density of at least 13.5 ppg, preferably at least 13.6 ppg, preferably at least 13.7 ppg, preferably at least 13.8 ppg, preferably at least 13.9 ppg, preferably at least 14 ppg, preferably at least 14.1 ppg, preferably at least 14.2 ppg, preferably at least 14.3 ppg, or 14.5 ppg and includes the GWP in a range of from 5 wt. % to 20 wt. % of the cement slurry, preferably 6 wt. % to 19 wt. %, preferably 7 wt. % to 18 wt. %, preferably 8 wt. % to 17 wt. %, preferably 9 wt. % to 16 wt. %, preferably 10 wt. % to 15 wt. %, preferably 11 wt. % to 14 wt. %, preferably 12 wt. % to 13 wt. %, or 12.5 wt. %. In in one example embodiment, the cement slurry includes at least 60 wt. % cement, preferably at least 61 wt. %, preferably at least 62 wt. %, preferably at least 63 wt. %, preferably at least 64 wt. %, preferably at least 65 wt. %, preferably at least 66 wt. %, preferably at least 67 wt. %, preferably at least 68 wt. %, preferably at least 69 wt. %, or at least 70 wt. %; at most 40 wt. % GWP, preferably at most 39 wt. %, preferably at most 38 wt. %, preferably at most 37 wt. %, preferably at most 36 wt. %, preferably at most 35 wt. %, preferably at most 34 wt. %, preferably at most 33 wt. %, preferably at most 32 wt. %, preferably at most 31 wt. %, or at most 30 wt. %; and at most 15 wt. % perlite, preferably at most 14 wt. %, preferably at most 13 wt. %, preferably at most 12 wt. %, preferably at most 11 wt. %, or at most 10 wt. %. In another example embodiment, the cured cement may have a density of at least 3 grams per cubic centimeter (g/cm$^3$), preferably at least 3.1 g/cm$^3$, preferably at least 3.2 g/cm$^3$, preferably at least 3.3 g/cm$^3$, preferably at least 3.4 g/cm$^3$, preferably at least 3.5 g/cm$^3$, preferably at least 3.6 g/cm$^3$, preferably at least 3.7 g/cm$^3$, preferably at least 3.8 g/cm$^3$, preferably at least 3.9 g/cm$^3$, or at least 4 g/cm$^3$. In some examples, the cured cement has a $D_{50}$ diameter of from 20 µm to 50 µm, preferably 22.5 µm to 47.5 µm, preferably 25 µm to 45 µm, preferably 27.5 µm to 42.5 µm, preferably 30 µm to 40 µm, preferably 32.5 µm to 37.5 µm or 35 µm.

At step 108, the method 100 includes adding 10 wt. % to 15 wt % perlite into the cement slurry to form a ternary blend, preferably 10.5 wt. % to 14.5 wt. %, preferably 11 wt. % to 14 wt. %, preferably 11.5 wt. % to 13.5 wt. %, preferably 12 wt. % to 13 wt. %, or 12.5 wt. %. In some example embodiments, an amount of silicon dioxide ($SiO_2$) of from 70 wt. % to 75 wt. % of the perlite, preferably 70.5 wt. % to 74.5 wt. %, preferably 71 wt. % to 74 wt. %, preferably 71.5 wt. % to 73.5 wt. %, preferably 72 wt. % to 73 wt. %, or 72.5 wt. %; an amount of ferric oxide ($Fe_2O_3$) of from 1 wt. % to 2 wt. % of the perlite, preferably 1.2 wt. % to 1.8 wt. %, preferably 1.4 wt. % to 1.6 wt. %, or 1.5 wt. %; and an amount of aluminium oxide ($Al_2O_3$) of from 9 wt. % to 15 wt. % of the perlite, preferably 10 wt. % to 14 wt. %, preferably 11 wt. % to 13 wt. %, preferably 11.5 wt. % to 12.5 wt. %, or 12 wt. %. In another example embodiment, the cement slurry has a sonic strength of from 650 psi to 1050 psi, preferably 700 to 1000 psi, preferably 750 to 950 psi, preferably 800 to 900 psi, or 850 psi. In another example embodiment, the ternary blend has a sonic strength of from 200 psi to 1575 psi, preferably 300 psi to 1500 psi, preferably 400 to 1400 psi, preferably 500 psi to 1300 psi, preferably 600 to 1200 psi, preferably 700 to 1100 psi, preferably 800 to 1000 psi, or 900 psi. The sonic strength refers to the extent of strength development of a cement sample calculated by measuring the velocity of sound through the sample.

At step 110, the method 100 includes injecting the ternary blend into the well to seal the well at the subterranean production zone. The ternary injected into the well has a compressive strength of from 30,000 pounds per square inch (psi) to 50,000 psi, preferably 32,000 psi to 48,000 psi, preferably 34,000 psi to 46,000 psi, preferably 36,000 psi to 44,000 psi, preferably 38,000 psi to 42,000 psi, or 40,000 psi at an effective pressure of 15,000 psi in the well. Compressive strength can be described as the capacity of material or structure to resist or withstand under compression. The compressive strength of a material is determined b the ability of the material to resist failure in the form of cracks and fissure At step 112, the method includes curing the ternary blend to seal a wall of the well at the subterranean production zone. In some embodiments, the curing may take place for approximately 48 hours, preferably 50 hours, preferably 52 hours, preferably 54 hours, preferably 56 hours, preferably 58 hours, or 60 hours. The GWP has a pozzolanic reaction with the cement producing a strength activity of from 100% to 110% compared to the cement, preferably 101% to 109%, preferably 102% to 108%, preferably 103% to 107%, preferably 104% to 106%, or 105%. The pozzolanic reaction can be described as the chemical reaction that occurs in cement upon the addition of pozzolans, so that the pozzolanic reaction converts a silica-rich precursor with no cementing properties, to a calcium silicate, with good cementing properties like strength activity. In some embodiments, the pozzolan used to catalyze the pozzolanic reaction can be a class N, class F, or class C pozzolan. In some example embodiments, the curing is at a bottomhole circulating temperature (BHCT) of at least 100° F., a bottom hole static temperature (BHST) of at least 160° F., and a bottom hole pressure (BHP) of at least 2600 psi. In some example embodiments, the ternary blend has a thickening time of from 120 minutes to 175 minutes which is measured at a BHCT of at least 100° F., preferably 130 minutes to 170 minutes, preferably 140 minutes to 160 minutes, or 150 minutes.

Further referring to a second part of FIG. 1, the order in which the method 150 is described is not intended to be construed as a limitation, and any number of the described method steps may be combined in any order to implement the method 150. Additionally, individual steps may be removed or skipped from the method 100 without departing from the spirit and scope of the present disclosure.

At step 152, the method 100 includes mix the GWP in a range of from 5 wt. % to 15 wt. % of the cement slurry with the cement to the aqueous solution. In some embodiments, the GWP is added in a range from 6 wt. % to 14 wt. % of the cement slurry, preferably 7 wt. % to 13 wt. %, preferably 8 wt. % to 12 wt. %, preferably 9 wt. % to 11 wt. %, or 10 wt. %. In some embodiments, adding the GWP and the cement to form the mixture includes blending at a speed of at least 20,000 rotations per minute (rpm), preferably at least 21,000 rpm, preferably 22,000 rpm, preferably 23,000 rpm, preferably 24,000 rpm, or 25,000 rpm. Dry mixing can be defined by mixing the materials without the presence of any water or liquid. In some embodiments, the GWP is added in a form of rock aggregates having a density of from 50 pounds per cubic foot (pcf) to 1000 pcf, preferably 100 pcf to 900 pcf, preferably 200 pcf to 800 pcf, preferably 300 pcf to 700 pcf, preferably 400 pcf to 600 pcf, or 500 pcf. In some examples, the cured cement has a $D_{50}$ diameter of from 20 μm to 50 μm, preferably 22.5 μm to 47.5 μm, preferably 25 μm to 45 μm, preferably 27.5 μm to 42.5 μm, preferably 30 μm to 40 μm, preferably 32.5 μm to 37.5 μm or 35 μm.

At step 154, the method 150 includes adding 10 wt. % to 15 wt. % of the cement slurry perlite into the cement slurry to form a ternary blend. In another embodiment, the cement and the GWP or in some cases with the perlite in the ternary blends were dry-mixed and added to the liquid phase composed of distilled water, pre-hydrated sodium bentonite, calcium chloride, dispersant, and an alcohol-based defoamer and then blended at 20000 rpm for 35 secs. In some embodiments, the perlite has a density of at least 2.60 g/cm$^3$, preferably at least 2.7 g/cm$^3$, preferably at least 2.8 g/cm$^3$, preferably at least 2.9 g/cm$^3$, preferably at least g/cm$^3$, preferably at least 3.1 g/cm$^3$, preferably at least 3.2 g/cm$^3$, preferably at least 3.3 g/cm$^3$, preferably at least 3.4 g/cm$^3$, or at least 3.5 g/cm$^3$. In some embodiments, the perlite has a $D_{50}$ diameter of from 70 μm to 100 μm, preferably 72.5 μm to 97.5 μm, preferably 75 μm to 95 μm, preferably 77.5 μm to 92.5 μm, preferably 80 μm to 90 μm, preferably 82.5 μm to 87.5 μm or 85 μm. In some examples, the amount of silica, alumina, and iron oxide in the ternary blend exceeds 70 wt. %, preferably exceeding 71 wt. %, preferably exceeding 72 wt. %, preferably exceeding 73 wt. %, preferably exceeding 74 wt. %, preferably exceeding 75 wt. %, preferably exceeding 76 wt. %, preferably exceeding 77 wt. %, preferably exceeding 78 wt. %, preferably exceeding 79 wt. %, or 80 wt. %.

In another embodiment, the cement is present in the cement slurry in the amount of from 80 wt. % to 85 wt. % of the ternary blend, preferably 80.5 wt. % to 84.5 wt. %, preferably 81 wt. % to 84 wt. %, preferably 81.5 wt. % to 83.5 wt. %, preferably 82 wt. % to 83 wt. %, or 82.5 wt. %; the GWP in an amount of from 5 wt. % to 15 wt. % of the ternary blend, preferably 6 wt. % to 14 wt. %, preferably 7 wt. % to 13 wt. %, preferably 8 wt. % to 12 wt. %, preferably 9 wt. % to 11 wt. %, or 10 wt. %; the perlite in an amount of from 5 wt. % to 10 wt. % of the ternary blend, preferably 5.5 wt. % to 9.5 wt. %, preferably 6 wt. % to 9 wt. %, preferably 6.5 wt. % to 8.5 wt. %, preferably 7 wt. % to 8 wt. %, or 7.5 wt. %; the calcium chloride ($CaCl_2$)) in the amount of at least 1 wt. % of the ternary blend, preferably at least 1.1 wt. %, preferably at least 1.2 wt. %, preferably at least 1.3 wt. %, preferably at least 1.4 wt. %, preferably at least 1.5 wt. %, preferably at least 1.6 wt. %, preferably at least 1.7 wt. %, preferably at least 1.8 wt. %, preferably at least 1.9 wt. %, or 2 wt. %; the bentonite in an amount of at least 2 wt. % of the ternary blend, preferably at least 2.1 wt. %, preferably at least 2.2 wt. %, preferably at least 2.3 wt. %, preferably at least 2.4 wt. %, preferably at least 2.5 wt. %, preferably at least 2.6 wt. %, preferably at least 2.7 wt. %, preferably at least 2.8 wt. %, preferably at least 2.9 wt. %, or 3 wt. %; a defoamer mass of at least 0.5 g, at least 0.6 g, at least 0.8 g, at least 1 g, at least 1.2 g, at least 1.4 g, at least 1.6 g, at least 1.8 g, or 2 g; and water to cement ratio of from 80% to 85%, preferably 80.5% to 84.5%, preferably 81% to 84%, preferably 81.5% to 83.5%, preferably 82% to 83%, or 82.5%.

In another embodiment, the cement is present in the cement slurry in an amount of from 55 wt. % to 65 wt. % of the ternary blend, preferably 56 wt. % to 64 wt. %, preferably 57 wt. % to 63 wt. %, preferably 58 wt. % to 62 wt. %, preferably 59 wt. % to 61 wt. %, or 60 wt. %; the GWP in an amount of from 25 wt. % to 35 wt. % of the ternary blend, preferably 26 wt. % to 34 wt. %, preferably 27 wt. % to 33 wt. %, preferably 28 wt. % to 32 wt. %, preferably 29 wt. % to 31 wt. %, or 30 wt. %; the perlite in an amount of from 5 wt. % to 10 wt. % of the ternary blend, preferably 5.5 wt. % to 9.5 wt. %, preferably 6 wt. % to 9 wt. %, preferably 6.5 wt. % to 8.5 wt. %, preferably 7 wt. % to 8 wt. %, or 7.5 wt. %; the ($CaCl_2$) in an amount of at least 1 wt. % of the ternary blend, preferably at least 1.1 wt. %, preferably at least 1.2 wt. %, preferably at least 1.3 wt. %, preferably at least 1.4 wt. %, preferably at least 1.5 wt. %, preferably at least 1.6 wt. %, preferably at least 1.7 wt. %, preferably at least 1.8 wt. %, preferably at least 1.9 wt. %, or 2 wt. %; the bentonite in an amount of at least 2 wt. % of the ternary blend, preferably at least 2.1 wt. %, preferably at least 2.2 wt. %, preferably at least 2.3 wt. %, preferably at least 2.4 wt. %, preferably at least 2.5 wt. %, preferably at least 2.6 wt. %, preferably at least 2.7 wt. %, preferably at least 2.8 wt. %, preferably at least 2.9 wt. %, or 3 wt. %; the defoamer mass of at least 0.5 g, at least 0.6 g, at least 0.8 g, at least 1 g, at least 1.2 g, at least 1.4 g, at least 1.6 g, at least 1.8 g, or 2 g; and the water to cement ratio of from 75% to 80%, preferably 75.5% to 79.5%, preferably 76% to 79%, preferably 76.5% to 78.5%, preferably 77% to 78%, or 78.5%.

In another embodiment, the cement is present in the cement slurry in an amount of from 45 wt. % to 55 wt. % of the ternary blend, preferably 46 wt. % to 54 wt. %, preferably 47 wt. % to 53 wt. %, preferably 48 wt. % to 52 wt. %, preferably 49 wt. % to 51 wt. %, or 50 wt. %; the GWP in an amount of from 30 wt. % to 40 wt. % of the ternary blend, preferably 31 wt. % to 39 wt. %, preferably 32 wt. % to 38 wt. %, preferably 33 wt. % to 37 wt. %, preferably 34 wt. % to 36 wt. %, or 35 wt. %; the perlite in an amount of from 10 wt. % to 15 wt. % of the ternary blend, preferably 10.5 wt. % to 14.5 wt. %, preferably 11 wt. % to 14 wt. %, preferably 11.5 wt. % to 13.5 wt. %, preferably 12 wt. % to 13 wt. %, or 12.5 wt. %; the $CaCl_2$) in an amount of at least 1 wt. % of the ternary blend, preferably at least 1.1 wt. %, preferably at least 1.2 wt. %, preferably at least 1.3 wt. %, preferably at least 1.4 wt. %, preferably at least 1.5 wt. %, preferably at least 1.6 wt. %, preferably at least 1.7 wt. %, preferably at least 1.8 wt. %, preferably at least 1.9 wt. %, or 2 wt. %; the bentonite in an amount of at least 2 wt. % of the ternary blend, preferably at least 2.1 wt. %, preferably at least 2.2 wt. %, preferably at least 2.3 wt. %, preferably at least 2.4 wt. %, preferably at least 2.5 wt. %, preferably at least 2.6 wt. %, preferably at least 2.7 wt. %, preferably at least 2.8 wt. %, preferably at least 2.9 wt. %, or 3 wt. %; the defoamer mass of at least 0.5 g, at least 0.6 g, at least 0.8 g, at least 1 g, at least 1.2 g, at least 1.4 g, at least 1.6 g, at least 1.8 g, or 2 g; and the water to cement ratio of from 75% to 80%, preferably 75.5% to 79.5%, preferably 76% to 79%, preferably 76.5% to 78.5%, preferably 77% to 78%, or 78.5%.

EXAMPLES

The following examples describe and demonstrate exemplary embodiments of a method for treating well-producing hydrocarbons from a subterranean production zone described herein. The examples are provided solely for illustration and are not to be construed as limitations of the present disclosure, as many variations thereof are possible without departing from the spirit and scope of the present disclosure.

Example 1: Materials

The raw materials used in the experiment were Class C cement (CaO:79.60%, $SiO_2$:7.63%, $Fe_2O_3$:9.11%), GWP ($SiO_2$:61.31%, $Fe_2O_3$:20.09%, $Al_2O_3$:9.92%) and expanded perlite ($SiO_2$:73.76%, $Fe_2O_3$:1.60%, $Al_2O_3$:9.86%). The total amount of silica, alumina, and iron oxide in the GWP and perlite exceeded 70%, making them pozzolans per (American Society for Testing and Materials (ASTM) C618-12a, 2013). The density of the cement, the GWP, and the perlite were 3.32 $g/cm^3$, 2.91 $g/cm^3$, and 2.60 $g/cm^3$, respectively.

Figure 2:
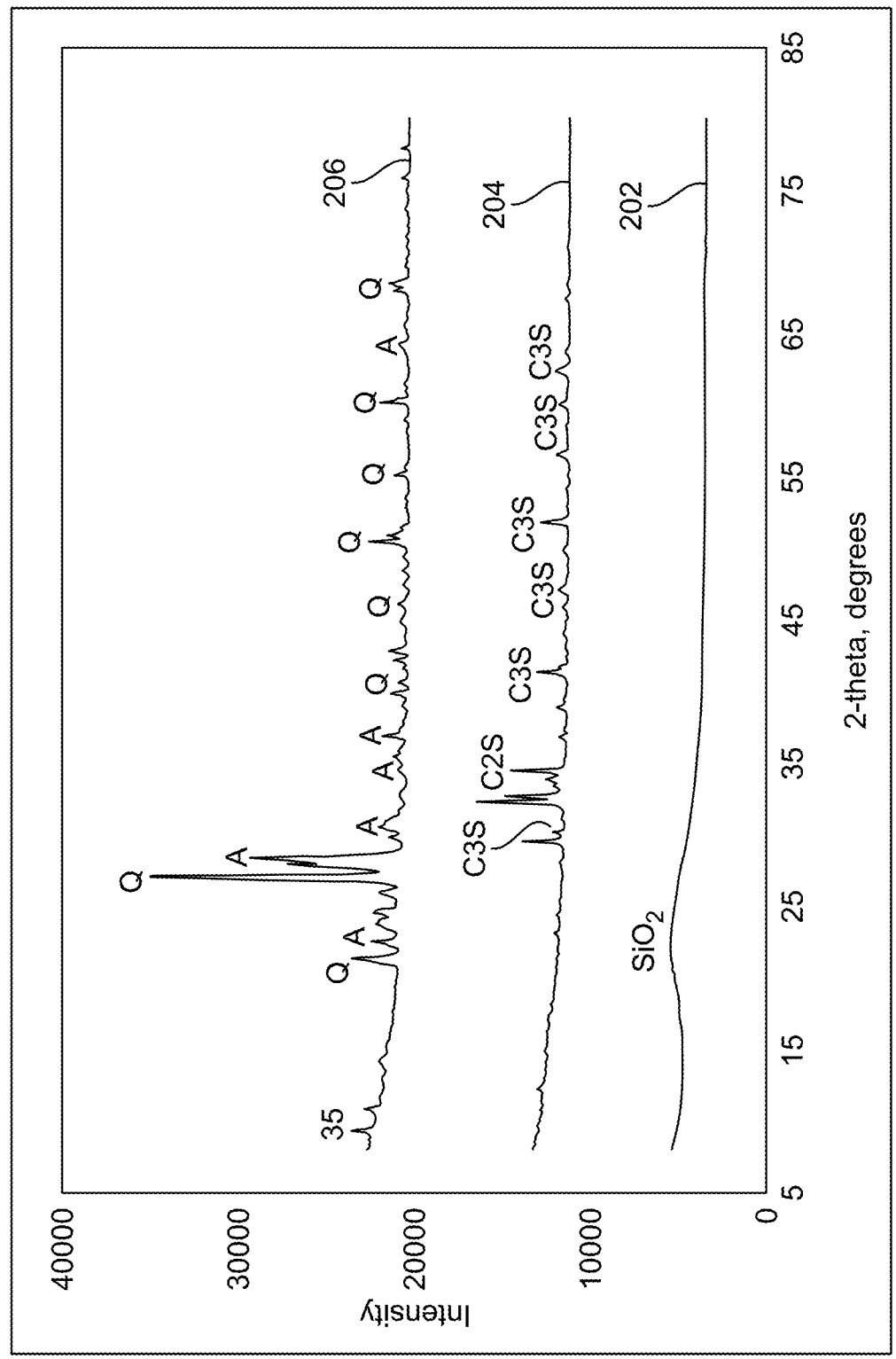
FIG. 2 illustrates the mineral phases in the cement, perlite, and GWP analyzed by a X-ray diffractometer (XRD) according to certain embodiments.

FIG. 2 illustrates the mineral phases in cement 204, perlite 202, and GWP 206 which were analyzed with the Ultima IV XRD by RIGAKU. The cement 204 contains the usual phases of dicalcium silicate ($C_2S$) and tricalcium silicate ($C_3S$). The GWP 206 was composed of albite (A) and quartz (Q), while the perlite 202 was mainly glassy.

Figure 3:
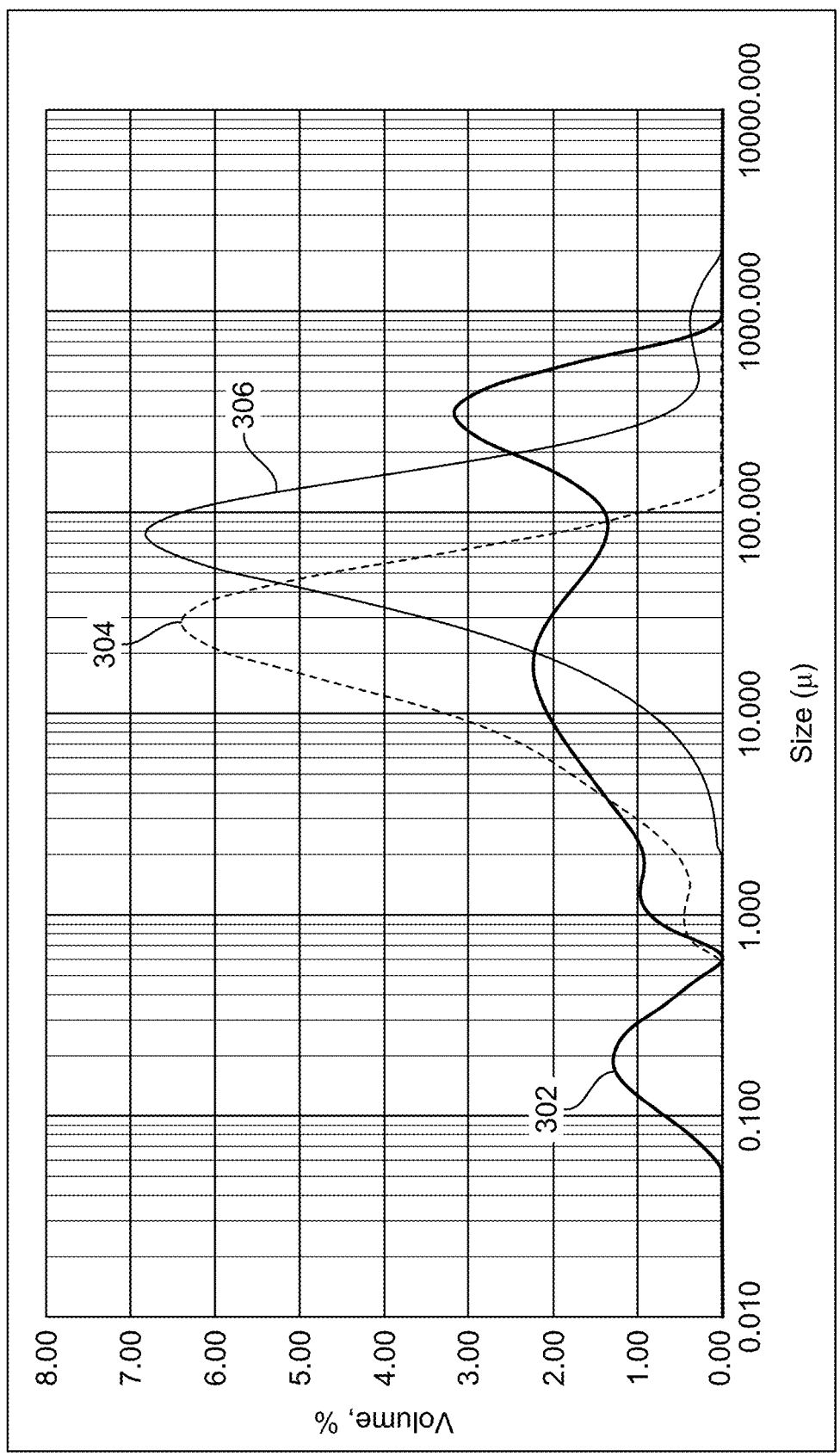
FIG. 3 illustrates a particle size distribution of raw materials measured by the laser diffraction technique, according to certain embodiments.

FIG. 3 illustrates the volume distribution of the cement 304, perlite 306, and GWP 302 as measured by the laser diffraction technique (Mastersizer 2000 by Malvern). $D_{50}$ diameters of the materials were 23.34 µm (cement), 72.45 µm (perlite), and 23.38 µm (GWP). The GWP curve has a broader distribution of particles, with a hump at the extreme left of the curve indicating the presence of very fine grains. The cement also contained some small particles. The perlite showed a hump on its extreme right, implying the presence of coarse grains.

Method

Example 2: Slurry Preparation

The GWP was dried at 221° F. to a constant weight. The cement slurries were prepared at approximately 13.5 ppg in a Waring blender according to American Petroleum Institute (API) (API RP 10B-2, 2013). The cement and the GWP or in some cases with the perlite in the ternary blends were dry-mixed and added to the liquid phase composed of distilled water, pre-hydrated sodium bentonite, calcium chloride, dispersant, and an alcohol-based defoamer and then blended at 20000 rpm for 35 secs. A secondary function of the $CaCl_2$) (accelerator) was that the $CaCl_2$) augmented in viscosification of the slurry, thereby preventing the segregation of the lightweight particles.

Example 3: Curing

The cement slurries were cured in a Chandler ultrasonic cement analyzer (UCA) and the strength development over time was monitored. The strength measured (sonic strength) was based on the transit time of ultrasound through the samples. The UCA was simulated at 114° F. bottomhole circulating temperature (BHCT), 163° F. bottomhole static temperature (BHST), and 2600 psi bottomhole pressure (BHP).

Example 4: Characterization of Hydrated Products

The XRD technique was used to investigate the hydration and pozzolanic processes in the systems. Before the measurements, the hardened cement samples were crushed, ground, and passed through a 75 µm sieve.

Results and Discussion

Compressive strength was a desirable mechanical property of cement-based systems because all other properties were either directly or indirectly related to it. For instance, in comparing different formulations, the sample with a highest compressive strength would be characterized by the highest tensile strength and Young's modulus, and lowest porosity.

Example 5: Part I: Properties of GWP-Based Lightweight Cement Systems

The first objective was to determine the feasibility of GWP as a partial replacement of cement in lightweight systems. Such investigation has not been explored in this field. The lightweight GWP-based cement systems were designed with the granite powder at different replacement levels, varying from 0 to 20% (e.g., G_5 for 5% replacement). Some amount of dispersant (varying from 0.15 to 0.25 g) was added to slurries, especially in the systems containing higher GWP content (15 and 20%). The proportion of the components in the GWP-based recipes is given in Table 1.

TABLE 1

Mix proportions for GWP-based samples.

| Recipe | Cement, % | GWP, % | $CaCl_2$, % | Bentonite, % | Defoamer, g | Water/Cement, % |
|---|---|---|---|---|---|---|
| G_0 | 100 | 0 | 1 | 2 | 0.5 | 84.3 |
| G_5 | 95 | 5 | 1 | 2 | 0.5 | 84 |
| G_10 | 90 | 10 | 1 | 2 | 0.5 | 83.3 |
| G_15 | 85 | 15 | 1 | 2 | 0.5 | 82.6 |
| G_20 | 80 | 20 | 1 | 2 | 0.5 | 82 |

Figure 4:
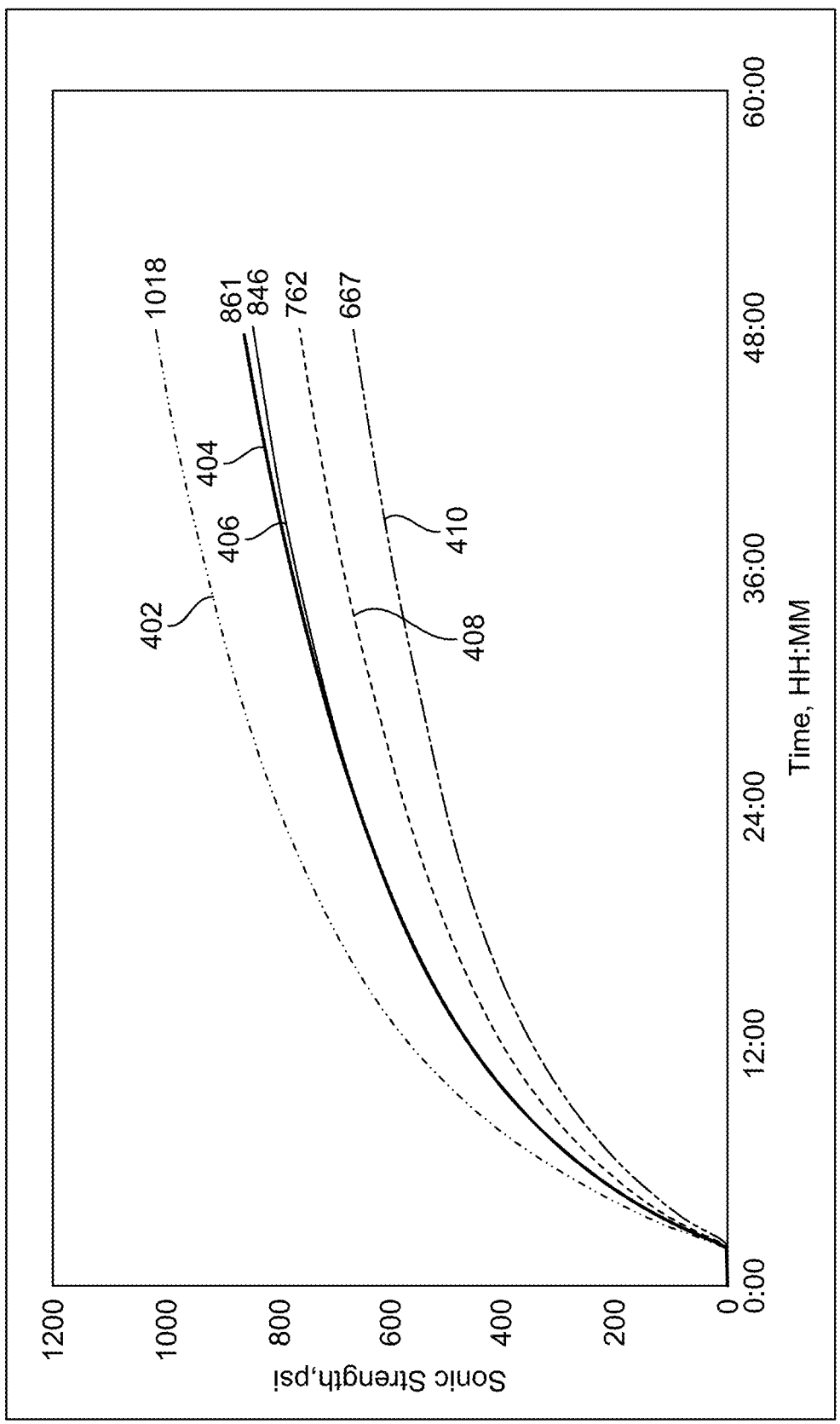
FIG. 4 illustrates a strength development of a granite waste powder (GWP)-based lightweight cement system over a 48 hour curing period, according to certain embodiments.

FIG. 4 compares the strength development of the GWP-based samples over a 48-hour curing period.

Figure 5:
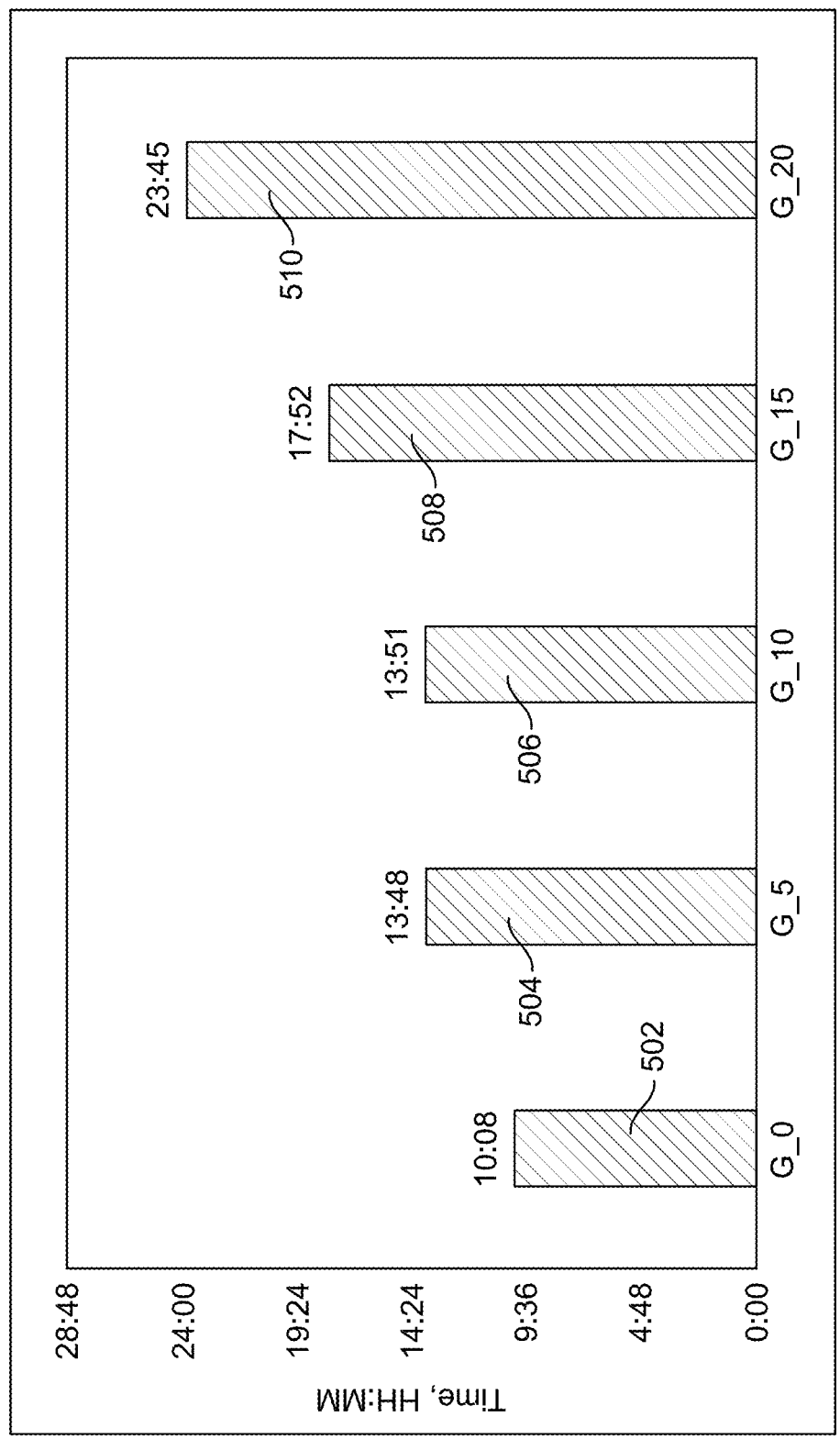
FIG. 5 illustrates a satisfactory strength development for G_0 to G_20 cement systems, attaining 500 pound-force per square inch (psi) in less than 24 hours, according to certain embodiments.

It was noticed that the sonic strength of the cement systems decreased with increasing GWP content (decreasing cement content). There was a reduction in strength of the G_20 (410) sample in comparison to the G_15 (408), G_10 (406), G_05 (404), and G_0 (402) systems. Reduction in strength from G_20 to G_0 is about 34%. However, all the GWP-based binary systems exhibited satisfactory strength of the G_20 (510) sample in comparison to the G_15 (508), G_10 (506), G_05 (504) and G_0 (502) systems, which attained 500 psi in less than 24 hours, FIG. 5. The conventional practice in the oil industry was that, at 500 psi, the cement sheath had developed adequate strength, and hence the next hole section might be drilled.

The decrease in strength was attributed to the reduction in the cement content, which caused a decrease in the reactive phases in the cement, and hence a lower amount of calcium silicate hydrate (C-S-H) gel was produced. The phenomena of decrease in strength was termed the dilution effect. Additionally, very little amount of portlandite was generated as a result of dilution, which would slow the pozzolanic reaction, especially for materials with low pozzolanic reactivity. The dilution effect might indicate that the GWP has low pozzolanic reactivity.

Figure 6:
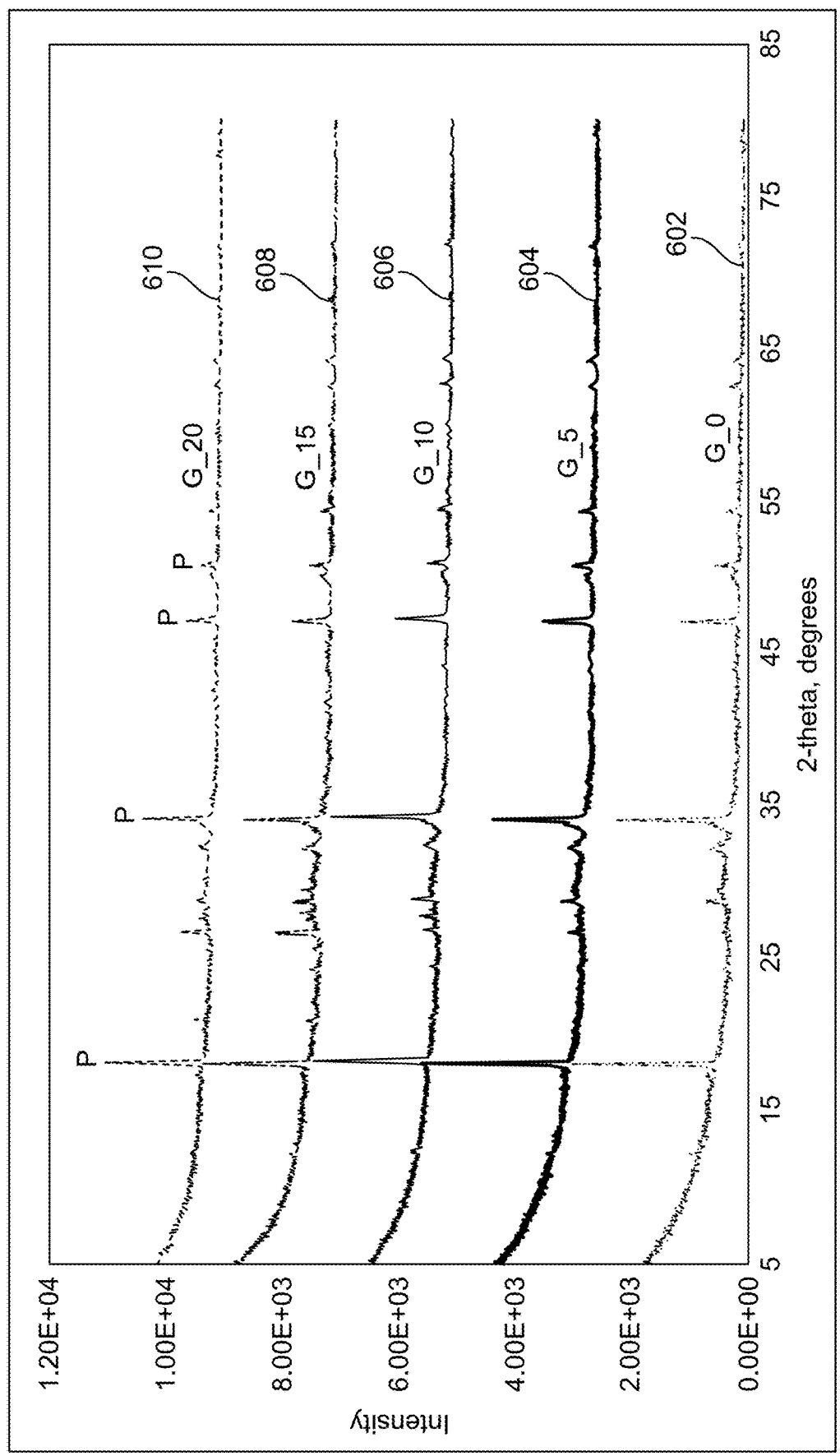
FIG. 6 illustrates diffractograms of powders of G_0 to G_20 cement systems cured for 48 hours, according to certain embodiments.

The XRD technique might be used to qualitatively study the pozzolanic reaction through the analysis of the intensity of the portlandite peaks. FIG. 6 illustrates the XRD analysis of powders of the G_0 (602), G_05 (604), G_10 (606), G_15 (608) and G_20 (610) systems cured for 48 hours. It showed that the intensity of the portlandite (P) peaks (at approximately 18, 34, 47, and 51° 2-theta degrees) generally decreased with decreasing cement content. If a pozzolanic reaction occurred, then the decrease in portlandite content would translate into an increase in strength. The fact that this decrease does not translate into strength implied that the decrease was not a result of portlandite consumption (pozzolanic reaction) but rather confirmed the dilution theory.

In the previous examples, the samples were cured for 48 hours. The strength development for the G_0 (702) and G_10 (704) systems over a 5-day (120 hours) period was studied for further understanding of the earlier observed phenomenon. Results were presented in FIG. 7 and Table 2. The strength of the G_0 (702) system was 16% higher than the G_10 (704) at 120 hours, FIG. 7. However, it was observed in Table 2 that the rate of strength development in the G_10 (704) system with time was higher than in the G_0 (702) system. For instance, the strength gained at 120 hours after 24 hours is 47% for the G_0 (702) system and 53% for the G_10 (704) system. Table 2 indicates that the difference in strength decreases as time progresses and hence in the long term the GWP-based system will recover the strength. The relation between decrease and recovering of strength would confirm the earlier suggestion that GWP was a slow-reacting pozzolan and would impact the later-age strength.

TABLE 2

Comparison of strength development for G_0 and G_10 systems over a 120-h period.

| Formulation | 24-hr strength, psi | 48-hr strength, psi | 72-hr strength, psi | 96-hr strength, psi | 120-hr strength | Strength gain after 24 hours, % |
|---|---|---|---|---|---|---|
| G_0 | 799 | 1018 | 1116 | 1158 | 1175 | 47 |
| G_10 | 663 | 846 | 942 | 988 | 1013 | 53 |
| Percent of G_10 about G_0 | 82.98 | 83.1 | 84.41 | 85.32 | 86.21 | |

Example 6: Part II: Effect of Perlite as Partial Replacement of GWP

Figure 7:
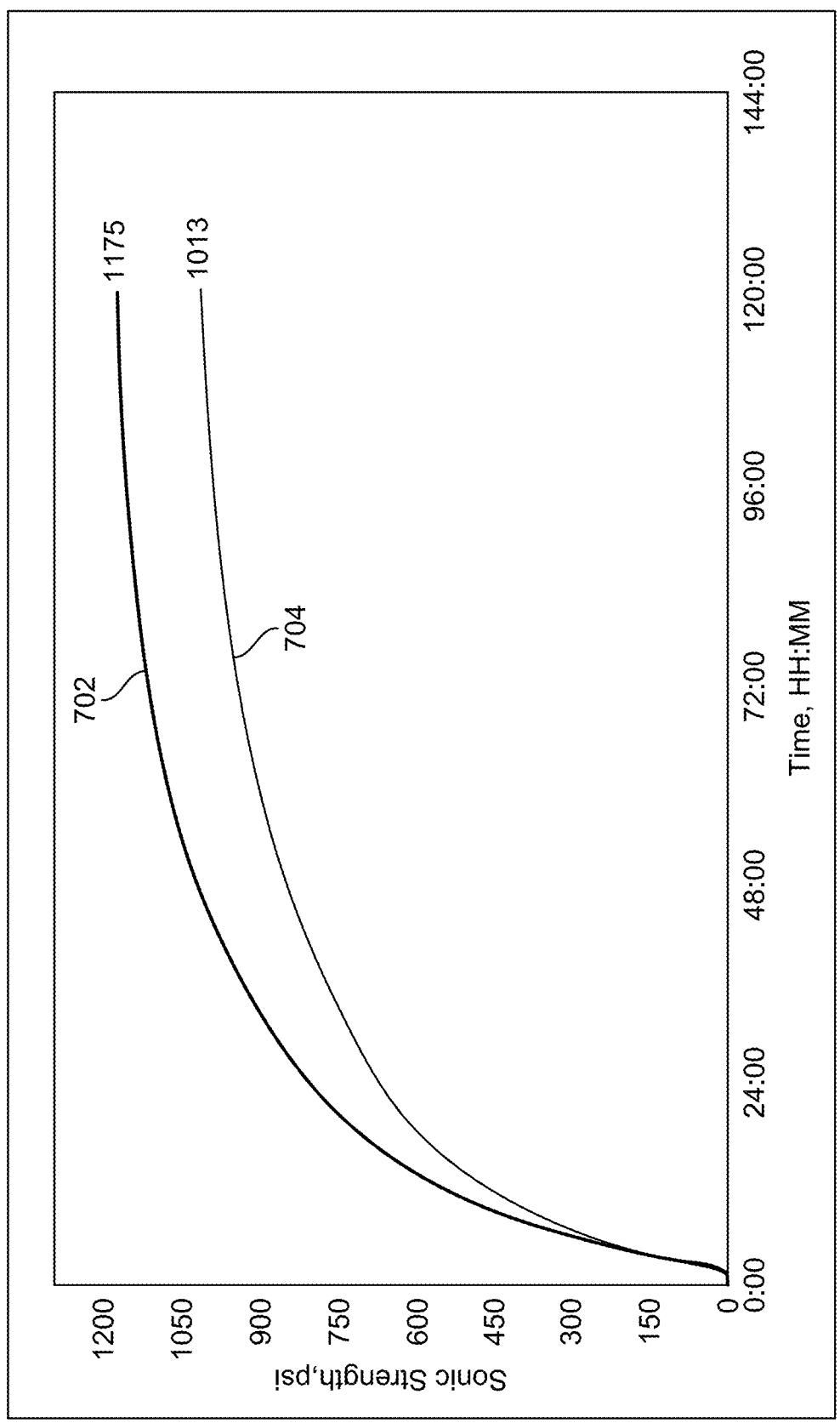
FIG. 7 illustrates strength development of G_0 and G_10 systems at 120 hours, according to certain embodiments.
Figure 8:
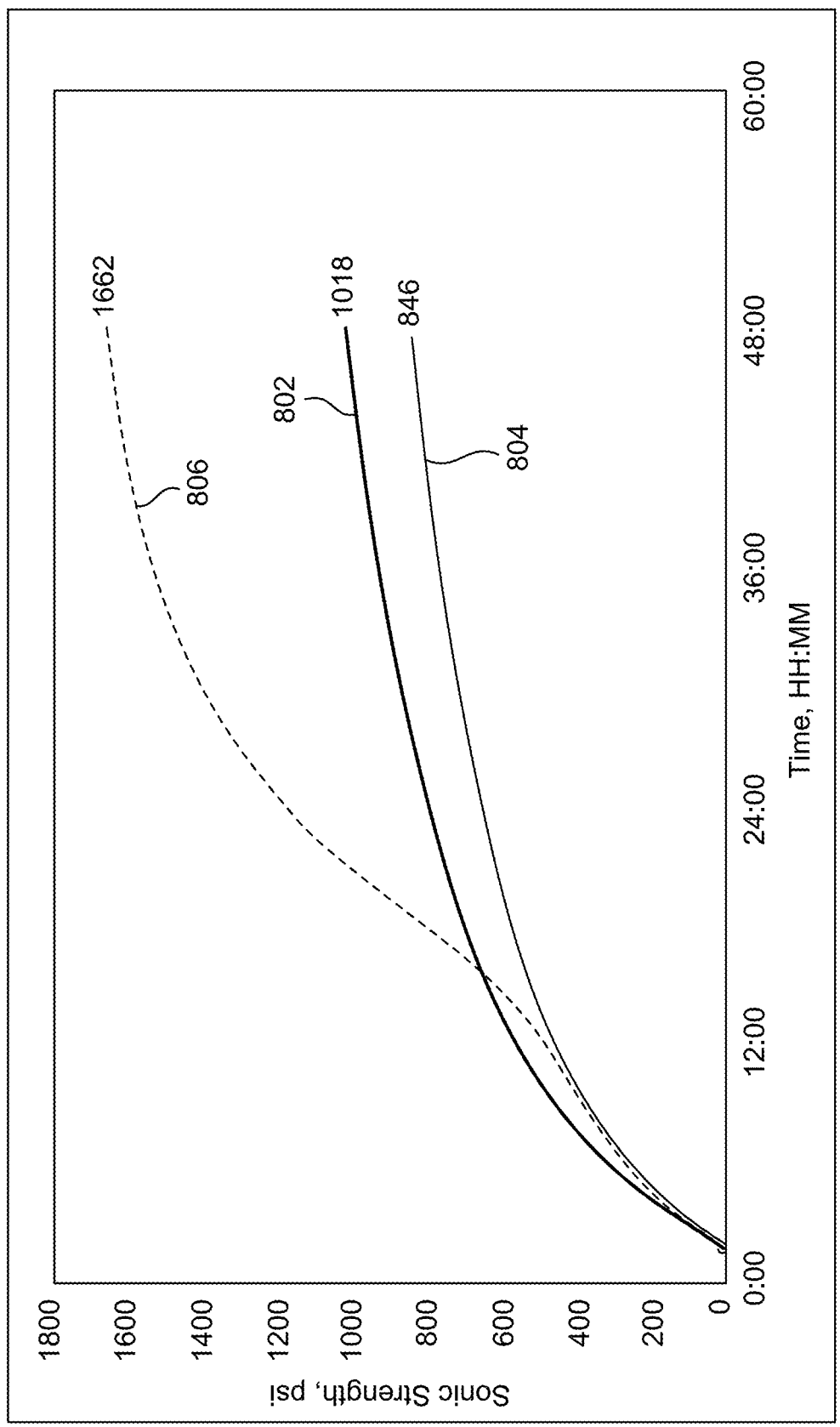
FIG. 8 illustrates strength development of G_0, G_10 and G_P_10 systems at 48 hours, according to certain embodiments.
Figure 9:
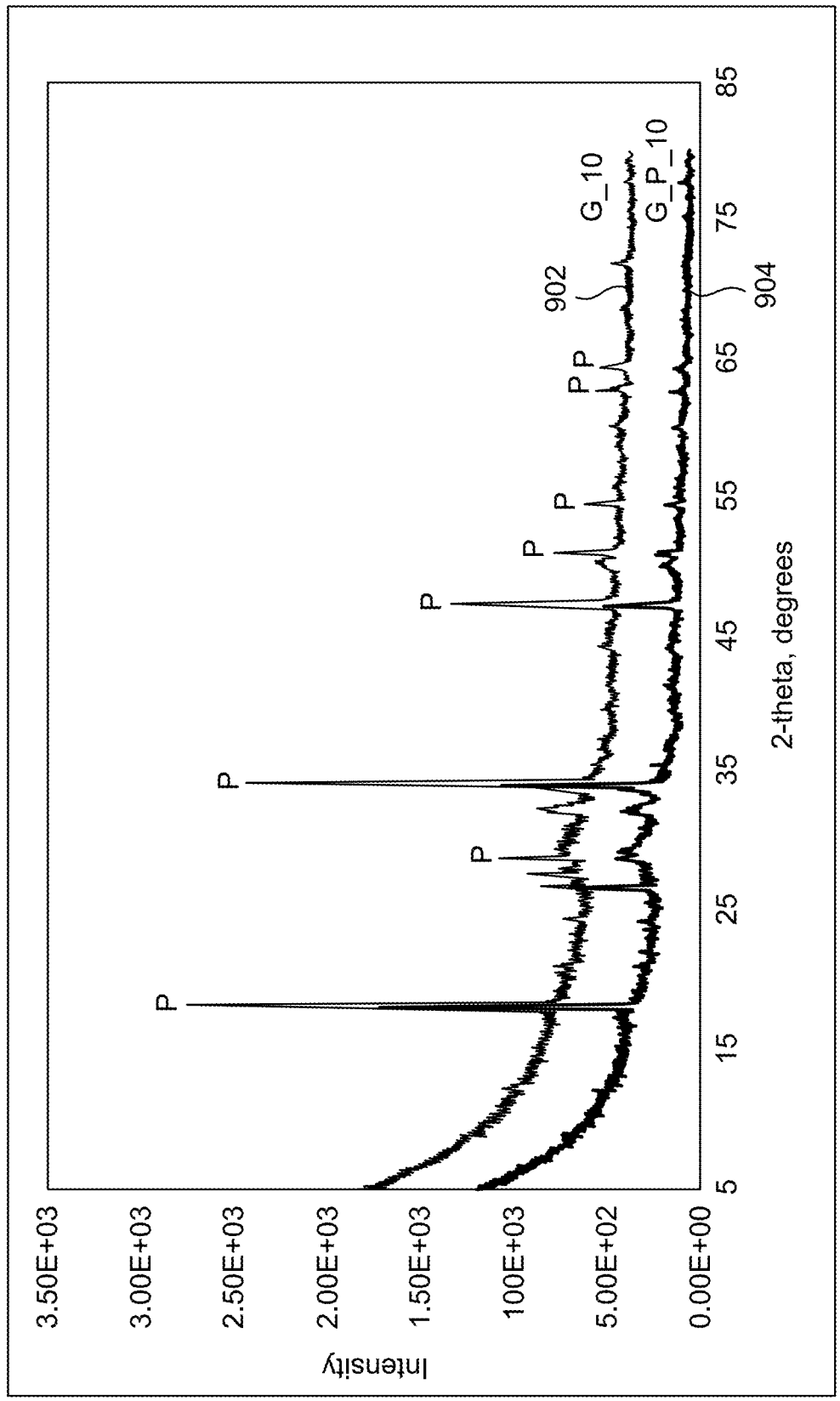
FIG. 9 illustrates a comparison of portlandite consumption of G_10 and G_P_10 systems, according to certain embodiments.

In Part I, it was established that GWP exhibits low pozzolanic reactivity and has a long-term effect and its usage in high volume reduce the strength of the cement system in the very early times. In FIG. 2, the XRD of the perlite indicates that the material was highly amorphous, the XRD of the perlite further suggested that it might possess high reactivity and would enhance the reactivity of the system at very early times. In most cases, silica fume and metakaolin were used, however, the perlite was abundant and exhibited comparative reactivity. In this section, 20% of pozzolans comprised of 10% GWP and 10% perlite (G_P_10) were combined to investigate the effect of a perlite powder on the strength development of the GWP-based system. The new slurry (G_P_10) was designed at the same density and simulated under the same conditions in Part I, Table 3. The 48-hour strength of the developed recipe was compared to the control system (G_0) and the system composed of the same amount of GWP (G_10). In FIG. 8, the G_0 802 system dominated in strength from time zero up to about 15 hours and 40 mins, while both pozzolanic-based systems exhibited equivalent strength development. After this period, the strength of the G_P_10 806 system increased and remained higher for the entire time duration. The strength of the ternary blend at the end of the test period was 63% and 96% higher than the G_0 802 and G_10 804 cement systems, respectively. Again, the 48-hour strength of the new recipe of ternary blend was about 41% higher than the 120-hour strength of the control sample, (FIG. 7). The observation of increase in strength per hour might be attributed to the rapid pozzolanic reactivity of the perlite, which led to enhanced strength at very early times in comparison to the sample designed with only GWP. Theory related to enhanced strength was confirmed by the diffractograms in FIG. 9, which showed a great reduction in the portlandite peaks for the granite-based sample containing perlite.

TABLE 1

Mix proportion for the ternary blend of cement, GWP, and perlite.

| Recipe | Cement, % | GWP, % | Perlite, % | CaCl$_2$, % | Bentonite, % | Defoamer, g | Dispersant, g | W/C, % |
|---|---|---|---|---|---|---|---|---|
| G_P_10 | 80 | 10 | 10 | 1 | 2 | 0.5 | 0.38 | 81 |

Example 7: Part III: Using GWP in High Volume

It has been established from the above experiments that the GWP has a long-term effect while the impact of the perlite on strength was noticed at very early times. Based on these findings it was investigated the possibility of using the GWP in high volume. New formulations were prepared using 60% and 50% cement only (Table 4), and the strength was investigated under the same conditions as in Parts I and II. The thickening time was measured at BHCT of 114° F. The performance of these new systems was compared to the G_0 recipe.

TABLE 4

Mix proportions for systems composed of GWP in high volume.

| Recipe | Cement, % | GWP, % | Perlite, % | CaCl$_2$, % | Bentonite, % | Defoamer, g | Dispersant, g | W/C, % |
|---|---|---|---|---|---|---|---|---|
| G_30_P_10 | 60 | 30 | 10 | 1 | 2 | 0.5 | 1 | 78.8 |
| G_35_P_15 | 50 | 35 | 15 | 1 | 2 | 0.5 | 1 | 77.2 |

Example 8: Thickening Time

The thickening time aids in cement slurry placement. The thickening time indicated how long the slurry might be pumped before slurry begins to set. Based on the objectives of the Operator, the times to reach 40 Bearden Consistency Units (BC), 50 BC, 60 BC, and 70 BC were often reported. By 100 BC, the placement should have been completed. The time to achieve a consistency of 60 BC was reported and is shown in Table 5. The granite-based recipes attained satisfactory thickening times, exceeding the base composite by about 45-55 minutes.

TABLE 5

Thickening times for cement systems.

| Formulation | Time to 60 BC, HH:MM |
|---|---|
| G_0 | 2:01 |
| G_30_P_10 | 2:54 |
| G_35_P_15 | 2:47 |

Example 9: Sonic Strength

Figure 10:
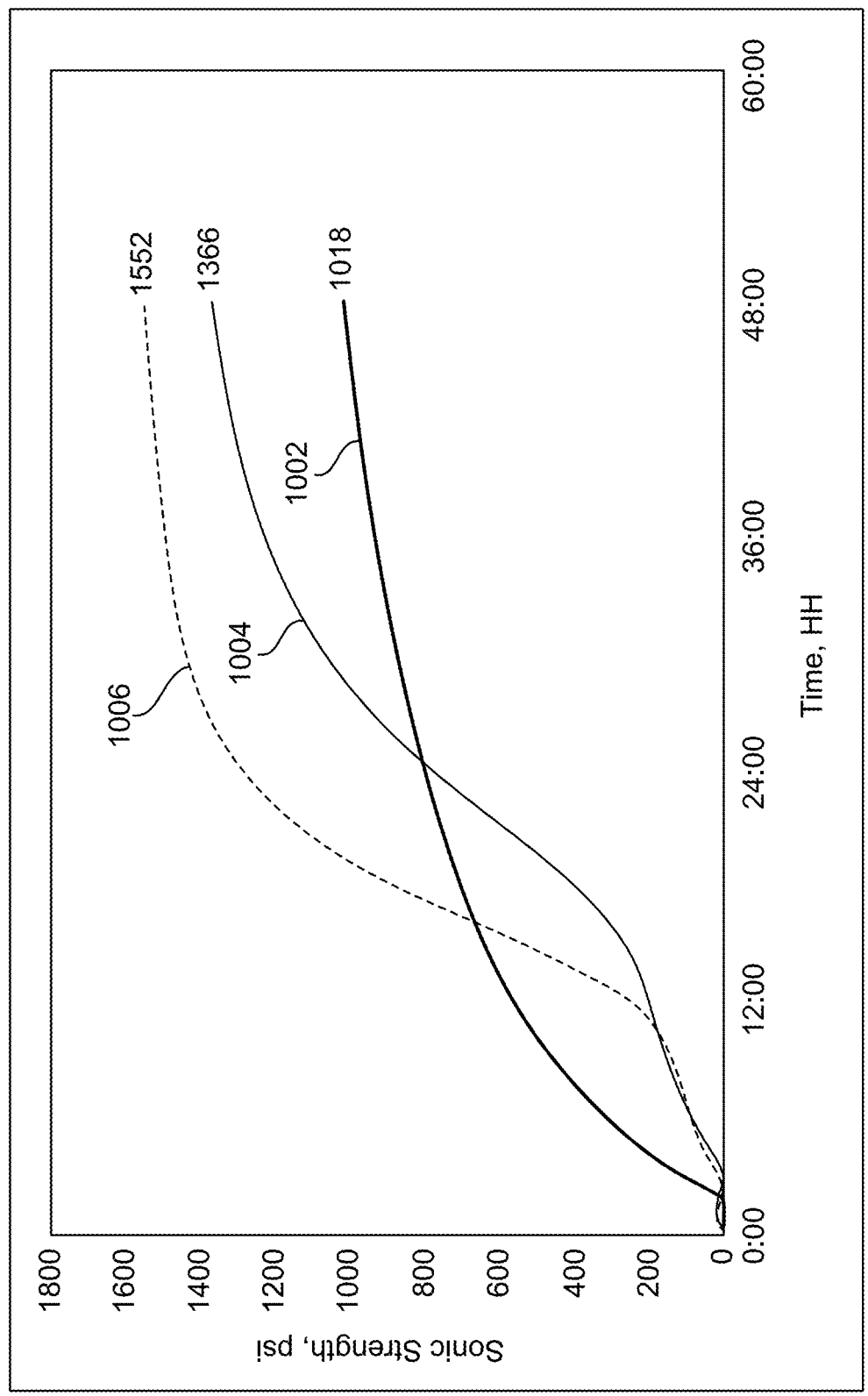
FIG. 10 illustrates the strength development of a control and high-volume GWP-based recipe, according to certain embodiments.

FIG. 10 shows the strength development for 48 hours. Table 6 provides the strength of the cement systems at different intervals. It was observed that for the first 12 hours, the control sample G_0 (1002) exhibited superior strength compared to the new recipes, achieving 50 psi and 500 psi in shorter times. However, the ternary systems display a 48-hour strength which was 34% G_30_P_10 (1004) and 53% G_35_P_15 (1006) higher than the G_0 system. The system composed of 60% cement, 30% GWP and 10% perlite G_30_P_10 (1004) have strength that was 13% lower than the sample composed of a lesser amount of cement G_35_P_15 (1006). This increased strength was due to enhanced pozzolanic reaction in the sample containing a higher amount of pozzolans.

TABLE 6

Comparison of strength development for control and high-volume GWP recipes.

| Formulation | 12-hr strength, psi | 24-hr strength, psi | 48-hr strength, psi | Time to 50 psi, HH:MM | Time to 500 psi, HH:MM |
|---|---|---|---|---|---|
| G_0 | 561 | 799 | 1018 | 2:27 | 10:08 |
| G_30_P_10 | 203 | 782 | 1366 | 4:47 | 19:34 |
| G_35_P_10 | 253 | 1288 | 1553 | 4:16 | 14:40 |

The present study presents the maiden studies on the properties of lightweight oil-well, cement systems designed with the granite waste powder (GWP). Additionally, the effect of the perlite on the strength development of the GWP composite has been investigated. The use of granite waste material in oil-well cementing will help eliminate the health issues associated with its disposal. Also, the use of a high amount of pozzolans will reduce the dependence on Portland cement.

The present study showed that the GWP has low pozzolanic reactivity and would impact long-term strength development. The perlite enhances the strength development of cement systems designed with the GWP. The ternary systems were designed at 60:40 (cement: pozzolan) and 50:50 exhibit comparable thickening times and strength that was about 34% and 53%, respectively, greater than the control sample containing 100% Portland cement.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for treating a well in a hydrocarbon-producing subterranean production zone, comprising:
   dry mixing granite waste powder (GWP) and cement to form a mixture;
   wherein the GWP has a $D_{50}$ diameter of from 10 μm to 100 μm; and
   mixing the mixture with an aqueous composition containing water, pre-hydrated sodium bentonite, calcium chloride, a dispersant, and an alcohol-based defoamer to form a cement slurry;
   wherein the cement slurry has a density of from 13.5 pounds per gallon (ppg) to 14.5 ppg and contains the GWP in a range of from 5 wt. % to 20 wt. % of the cement slurry; and
   adding 10 wt. % to 15 wt. % of perlite into the cement slurry to form a ternary blend;
   injecting the ternary blend into the well at the hydrocarbon-producing subterranean production zone;
   curing the ternary blend to seal a wall of the well at the hydrocarbon-producing subterranean production zone; and
   wherein the cured ternary blend has a compressive strength of from 30,000 pounds per square inch (psi) to 50,000 psi at an effective pressure of 15,000 psi in the well.

2. The method of claim 1, wherein the curing takes place for approximately 48 hours; and
   the GWP has a pozzolanic reaction with the cement during the curing producing a strength activity of from 100% to 110% compared to the cement.

3. The method of claim 2, wherein the curing is at a bottomhole circulating temperature (BHCT) of 100 to 130° F., a bottomhole static temperature (BHST) of 160 to 170° F., and a bottomhole pressure (BHP) of 2550 to 2600 psi.

4. The method of claim 1, wherein mixing the GWP and the cement to form the mixture includes blending at a speed of 20,000 to 25,000 rotations per minute (rpm).

5. The method of claim 1, wherein the cement slurry consists of the pre-hydrated sodium bentonite, the calcium chloride, the dispersant, and the alcohol-based defoamer.

6. The method of claim 1, wherein the ternary blend has a thickening time of from 120 minutes to 175 minutes which is measured at a BHCT of 100 to 130° F.

7. The method of claim 1, wherein the cement has an amount of CaO of from 75 wt. % to 80 wt % of the cement, an amount of $SiO_2$ of from 5 wt. % to 8 wt. % of the cement, and an amount of $Fe_2O_3$ of from 8 wt. % to 12 wt. % of the cement.

8. The method of claim 1, wherein the GWP has an amount of $SiO_2$ of from 60 wt. % to 65 wt. % of the GWP, an amount of $Fe_2O_3$ of from 15 wt. % to 21 wt. % of the GWP, and an amount of $Al_2O_3$ of from 7 wt. % to 14 wt. % of the GWP.

9. The method of claim 1, wherein the perlite has an amount of $SiO_2$ of from 70 wt. % to 75 wt. % of the perlite, an amount of $Fe_2O_3$ of from 1 wt. % to 2 wt. % of the perlite, and an amount of $Al_2O_3$ of from 9 wt. % to 15 wt. % of the perlite.

10. The method of claim 2, wherein the cured ternary blend has a density of 3 to 4 g/cm$^3$.

11. The method of claim 2, wherein the GWP has a $D_{50}$ diameter of from 20 μm to 50 μm.

12. The method of claim 1, wherein the cement slurry has a sonic strength of from 650 psi to 1050 psi.

13. The method of claim 1, wherein the ternary blend has a sonic strength of from 200 psi to 1575 psi.

14. The method of claim 1, wherein the GWP is present in the cement slurry in a range of from 5 wt. % to 15 wt. % of the cement slurry; and
   the perlite is present in the cement slurry in a range of from 10 wt. % to 15 wt. % of the cement slurry perlite.

15. The method of claim 14, wherein the ternary blend comprises:
   the cement in an amount of from 80 wt. % to 85 wt. % of the ternary blend, the GWP in an amount of from 5 wt. % to 15 wt. % of the ternary blend, the perlite in an amount of from 5 wt. % to 10 wt. % of the ternary blend, the $CaCl_2$ in an amount of 1 to 2 wt. % of the ternary blend, the bentonite in an amount of at least 2 wt. % of the ternary blend, a defoamer mass of 0.5 to 2 g, and has a water to cement ratio of from 80% to 85%.

16. The method of claim 14, wherein the ternary blend comprises:
   the cement in an amount of from 55 wt. % to 65 wt. % of the ternary blend, the GWP in an amount of from 5 wt. % to 15 wt. % of the ternary blend, the perlite in an amount of from 5 wt. % to 10 wt. % of the ternary blend, the $CaCl_2$ in an amount of 1 to 2 wt. % of the ternary blend, the bentonite in an amount of at least 2 wt. % of the ternary blend, a defoamer mass of 0.5 to 2 g, and a water to cement ratio of from 75% to 80%.

17. The method of claim 14, wherein the ternary blend comprises:
   the cement in an amount of from 45 wt. % to 55 wt. % of the ternary blend, the GWP in an amount of from 5 wt. % to 15 wt. % of the ternary blend, the perlite in an amount of from 10 wt. % to 15 wt. % of the ternary blend, the $CaCl_2$ in an amount of 1 to 2 wt. % of the ternary blend, the bentonite in an amount of at least 2 wt. % of the ternary blend, a defoamer mass of 0.5 to 2 g, and a water to cement ratio of from 75% to 80%.

18. The method of claim 14, wherein the perlite has a density of 2.60 to 3.5 g/cm$^3$.

19. The method of claim 14, wherein an amount of silica, alumina, and iron oxide in the ternary blend exceeds 70 wt. % based on the total weight of the ternary blend.

20. The method of claim 14, wherein the perlite has a $D_{50}$ diameter of from 70 μm to 100 μm.

* * * * *